United States Patent [19]

Kleiner et al.

[11] Patent Number: 4,596,669

[45] Date of Patent: Jun. 24, 1986

[54] FLAME RETARDANT THERMOPLASTIC MOLDING COMPOSITIONS OF HIGH ELECTROCONDUCTIVITY

[75] Inventors: Lothar W. Kleiner, Mentor; Andrew S. Pazur, Avon, both of Ohio

[73] Assignee: Mitech Corporation, Willoughby, Ohio

[21] Appl. No.: 443,606

[22] Filed: Nov. 22, 1982

Related U.S. Application Data

[63] Continuation-in-part of Ser. No. 334,445, Dec. 24, 1981, abandoned.

[51] Int. Cl.$^4$ .............................................. H01B 1/06
[52] U.S. Cl. .................................. 252/511; 524/495; 524/496; 264/104; 264/105
[58] Field of Search .................. 252/511, 602, 609; 524/495, 496, 500, 504, 524, 527, 563, 565, 567, 568; 523/220; 264/45.1, 45.9, 46.1, 46.8, 104, 105, 331.13, 331.11, 330

[56] References Cited

U.S. PATENT DOCUMENTS

| | | | |
|---|---|---|---|
| 4,151,132 | 4/1979 | Khanna | 260/23 XA |
| 4,228,050 | 10/1980 | Martin et al. | 260/23 XA |
| 4,233,191 | 11/1980 | Reuter et al. | 252/511 |
| 4,241,120 | 12/1980 | Datta et al. | 428/65 |
| 4,288,352 | 9/1981 | Weiss et al. | 260/23.5 A |
| 4,288,568 | 9/1981 | Lewis et al. | 525/111 |
| 4,293,452 | 10/1981 | Fox et al. | 252/518 |
| 4,399,061 | 8/1983 | Sickert | 252/511 |

FOREIGN PATENT DOCUMENTS 1578447 11/1980 United Kingdom .

OTHER PUBLICATIONS

Modern Plastics, Jun. 1979, p. 62.

*Primary Examiner*—Josephine L. Barr
*Attorney, Agent, or Firm*—John P. Hazzard

[57] ABSTRACT

Flame retardant, thermoplastic molding compositions of high electroconductivity comprising between about 2% and about 45% by weight of finely divided conductive carbon black particles substantially uniformly dispersed within a cementitious matrix having a chlorine content of at least about 24% by weight and composed predominantly of substantially thermoplastic resins not substantially less than half of which by weight are vinyl chloride polymers which have a vinyl chloride content of at least about 70% by weight and K-values between about 45 and about 70, and wherein said cementitious matrix also contains from about 1% to about 15% by weight of a well balanced lubricant/stabilizer combination comprising lubricants which are solid at temperatures up to at least about 50° C., together with effective stabilizers, are disclosed.

17 Claims, No Drawings

FLAME RETARDANT THERMOPLASTIC MOLDING COMPOSITIONS OF HIGH ELECTROCONDUCTIVITY

CROSS-REFERENCE TO RELATED APPLICATION

This application is a continuation-in-part of application Ser. No. 334,445 filed Dec. 24, 1981, now abandoned.

This invention is directed to carbon black filled thermoplastic compositions which can be quickly fabricated by simple, elevated temperature molding techniques into structurally sound rigid articles which are both flame retardant and electrically conductive.

BACKGROUND OF THE INVENTION

Conductive plastic compositions have been well received as desirable raw materials for fabrication of a variety of specialized accessories and components, including static electricity dissipation devices, electrical heating elements, equipment parts for high frequency protection and/or electro magnetic interference (EMI) shielding, video discs, anti-static packaging profiles, and a variety of other electrical components such as electrodes, terminals, connectors, and the like.

Thermosetting or heat-curable polymer systems have, to date, been the most prominent of such conductive plastic materials which have been developed. For certain electrical applications, the resistance of many thermosetting materials to high temperature service conditions is a major consideration. However, generally a more important factor resides in the inherent reactivity responsible for the thermosetting character of these materials which tends to increase the polymeric interactions with the finely subdivided conductive solids (e.g., metallic powders, carbon blacks and the like) that must be incorporated into polymeric base materials in order to provide the appropriate levels of conductivity.

Most thermoplastic resins, on the other hand, are considerably less likely to react with additions of finely divided solid fillers. This usually results in an actual deterioration of many structurally significant physical properties when thermoplastic resins loaded with carbon blacks, powdered metals and the like to the amounts required for reaching practical levels of electroconductivity. Such deficiencies have severely limited applications for these conductive thermoplastic compositions, confining them, for the most part, to the fabrication of at least partly supported auxiliary elements and secondary components like seals, gaskets, inserts and electrodes.

In spite of such difficulties, filled thermoplastic systems have, of course, continued to receive attention since rigid thermoplastic resins offer definite advantages over most thermosetting materials. These advantages include, for example, ease of handling, melt processing convenience and the simplicity of fabricating finished articles therefrom by well-known high speed plastic forming techniques such as, for example, extrusion and injection molding.

Indicative of approaches which have been taken in an effort to develop carbon black filled thermoplastic compositions with the necessary overall performance and utility are those disclosed in the publications summarized below.

U.S. Pat. No. 4,241,120 to Data et al discloses a method of formulating carbon black filled thermoplastic resin compositions wherein the carbon black particles are modified by grafting polymers onto the carbon black particles prior to adding them to a PVC base molding composition, said compositions containing from 12% to 40% carbon black suitable for video discs having low shrinkage characteristics.

U.S. Pat. No. 4,228,050 to Martin et al discloses a carbon black filled compression molding composition containing from 12% to 40% carbon black suitable for video discs having low shrinkage characteristics.

U.S. Pat. No. 4,151,132 to Khanna describes a carbon black filled molding composition containing 12% to 20% conductive carbon black particles, about 10% vinyl chloride-vinyl acetate copolymer, 10% vinyl chloride-maleate ester copolymer, and about 15% to 17% of polymeric plasticizers and processing aids with about 3.5% of two or more metal stabilizers and 1.5% of three or more lubricants, the remainder being a copolymer of vinyl chloride containing about 6% to 8% propylene.

Additional approaches to solving the problems of providing thermoplastic molding compositions have been, for example, the use of graphite/carbon fibers; the use of special plastic materials such as hydroxyl terminated polyether (HTE) and the like as reviewed, for example, in *Modern Plastics*, p. 62 (June, 1979).

These various products and/or directions, however, appear to be limited in their application since they do not allow for the high speed, "molten state," mixing and molding operations for which thermoplastics are so well suited and the reason for which thermoplastics are usually selected in commercial practice. Also, it will be appreciated that many of these materials will raise the cost of the manufactured item prohibitively when compared to the commercial alternatives already in use.

In view of the apparent state of this art, a considerable need continues to exist for a flame retardant, thermoplastic molding composition of high electroconductivity. In particular, a clear need is sensed for such compositions which are not only derived from a thermoplastic resinous matrix, but which can also be economically and conveniently prepared and dependably fabricated by conventional high speed techniques into a wide variety of shaped articles having both good conductivity and sound physical integrity. One of the most challenging raw material requirements in this field is the need for conductive thermoplastic molding and extrusion compounds suitable for forming flame retardant structural members of sufficient size, mass and complexity to serve as electronic equipment housings, dampers and/or shields for absorbing or blocking out electromagnetic field effects or other high frequency electrical emissions. Thus, for example, the computer and auto industries have set guidelines which indicate that materials having a shielding effectiveness (SE) of 20 to 30 dB will meet 50% of their needs, while an SE of 30 to 40 dB will meet 95% of their needs. Shielding effectiveness is an absolute ratio normally expressed in decibels (dB) and defined on a logarithmic scale through the following equations:

$$SE = 20 \log (E_i/E_t)$$

or $$SE = 10 \log (P_i/P_t)$$

where E is the field strength in volts per unit length, P is the field strength in watts per unit area, i is the incident field and t is the transmitted field. Alternatively, SE can also be expressed on a linear scale as a percent attenuation (PA). PA is simply (Ei/Et)×(100) or (Pi/Pt)×(100). Thus, 99% attenuation corresponds to 20 dB, 99.9% to 30 dB and 99.99% to 40 dB. Finally, it should be pointed out that there is often a crude correlation between the shielding effectiveness and the volume resistivity, such that a volume resistivity of lower than 6 ohm-cm *usually* ensures that the shielding effectiveness will be at least 30 dB.

It is also understood, however, that this level of shielding effectiveness is not needed for "anti-static" applications and, therefore, lower levels of protection will suffice, for example, volume resistivity levels of less than $1 \times 10^8$ ohm-cm.

Accordingly, a primary goal of the present invention is the production of a family of flame retardant, thermoplastic molding and extrusion compounds of high electroconductivity which can be readily shaped even by fast thermoplastic processing techniques to form rigid articles having well balanced all around physical properties and adequate structural stability for many diversified electrically conducting specialty applications. A more specific objective of the invention is to formulate flame retardant, thermoplastic molding and extrusion compounds, the ingredients and composition of which are further restricted and optimized so that exceptional levels of electroconductivity as well as outstanding physical properties are obtained in the articles molded therefrom without the need for grafting of the carbon black particles to a polymer. Such optimized molding and extrusion compounds are particularly needed for certain specialized structural uses, such as EMI shielding members, electronic equipment housings, and the like, as well as anti-static materials such as video discs and packaging profiles, and thus represent a preferred embodiment of the present invention.

SUMMARY OF THE INVENTION

Broadly stated, the present invention comprises a flame retardant, thermoplastic molding and/or extrusion compositions of high electroconductivity comprising between 2% and about 45% by weight of finely divided conductive carbon black substantially uniformly dispersed within a cementitious matrix having a chlorine content of at least about 24% by weight and composed predominantly of substantially thermoplastic resins not substantially less than half of which by weight are vinyl chloride polymers which have a vinyl chloride content of at least about 80% by weight and K-values between about 45 and 70, said cementitious matrix also containing from about 3% to about 15% by weight of a well balanced combination of lubricants which are solid at temperatures from about ambient to about 50° C., together with effective stabilizers.

Said cementitious matrix may also contain various optional additives compatible with the polymeric vinyl chloride base thereof. These optional additives include minor ingredients of the type normally used in very low concentrations, e.g., of the order of only 1% or 2%, such as, for example, liquid plasticizers and lubricants, dyes or pigments and various stabilization synergists, as well as a few auxiliary materials which may be incorporated in larger proportions, substantially the total content of which could run as high as about 10% by weight in some cases. However, the most significant of the optional additives are various solid polymeric adjuvants blendable with rigid vinyl chloride resins to modify properties such as processability, toughness and/or high temperature strength, etc., the total amount of which most typically would equal between about 5% and about 35% by weight, but may occasionally be as high as about 50% by weight of the cementitious matrix provided that the total chlorine content of said matrix is not below about 24% by weight. The most advantageous of these various polymeric adjuvants are those generally classified as impact modifiers. Wide variations are possible in the chemical composition of said polymeric impact modifiers, but they generally exhibit a fundamentally hybrid character reflecting the presence therein of segments or blocks varying significantly in compatibility with rigid vinyl chloride resins. Thus, effective polymeric adjuvants for this purpose are typically sufficiently compatible with the vinyl chloride resins to flux readily therewith under normal melt blending conditions, but not to the point of total-single phase miscibility. In the present case, they are preferably either copolymer products such as those obtained by so-called graft polymerization process in the presence of preformed rubber, or chlorinated linear polyethylenes containing between about 25% and about 50% by weight of chlorine.

DETAILED DESCRIPTION

The vinyl chloride resins which serve as the basic and principal component of the cementitious matrix of the molding compounds of the present invention may be homopolymers and/or copolymers containing not more than 20% by weight of suitable comonomers and having K-values between about 45 and about 70, preferably between about 50 and about 60. These values correspond approximately to the lower to intermediate molecular weight range of such rigid resins, i.e., those from about 25,000 to about 110,000 in weight-average molecular weight and preferably from about 40,000 to about 85,000. The best known of the suitable comonomers are vinylidene chloride, olefinic hydrocarbons like ethylene, propylene, etc., vinyl esters such as vinyl acetate, vinyl aromatics such as stryrene, acrylic acids and their derivatives (e.g., ethyl acrylate, acrylamide or acrylonitrile) and vinyl heterocyclics like vinyl pyridine. The most preferred of said base resins are those with K-values between about 50 and about 60 and which contain at least about 80% by weight of vinyl chloride.

The finely divided conductive carbon black suitable for use in the present invention generally are extremely finely divided, i.e., typically have an average particle size within the range of from about 25 millimicrons to about 35 millimicrons. Such conductive carbon black also has a bulk density range of about 125 g/l to about 300 g/l and a nitrogen surface area of from about 200 to 1,500 m$^2$/g. Examples of suitable carbon blacks which are commercially available will be found in the examples following below.

In addition to the use of the finely divided conductive carbon black and the base vinyl chloride resins of lower to intermediate K-value and/or molecular weight as particularly described hereinabove, it is also essential to include in the cementitious matrix of the present invention a well balanced and highly effective stabilizer/lubricant system of additives in order to enable thorough incorporation of said finely divided conductive carbon black particles to be effected with ease and safety and to assure adequate processability and stability in the carbon black filled thermoplastic compositions thus produced. This stabilizer/lubricant system comprises at least three different classes of additive such that each of the three different classes comprises at least 1% by weight of the cementitious matrix and further characterized in that the total weight of this system does not exceed 15% of the total cementitious matrix weight. Thus, it can be seen that the total weight percent of this stabilizer/lubricant system is from 3% to 15%, based on the weight of the total cementitious matrix.

The first of these classes of additive is waxy lubricants. The waxy lubricants suitable for use in the present invention are preferably derived from paraffinic hydrocarbon fractions found in mineral deposits such as petroleum, peat and coal or from essentially aliphatic hydrocarbon polymers such as polyethylene and similar polyolefins, including such materials which have been partially oxidized, animal and plant products such as wool wax and castor wax, as well as various mixtures of any of the same. These lubricants are solid at temperatures up to at least 50° C. under normal pressure. Examples of waxy lubricants suitable for use in the present invention are, for example, 165° F. waxes, such as Boler 1014 (Boler Petroleum); XL 165 (American Hoechst); oxidized polyethylene, such as AC 629A (Allied Chemical); ester waxes, including complex blends such as CW-2 (NL Industries); polyethylene waxes, such as AC 6A (Allied Chemical) and amide waxes, such as Advawax 280F (Thiokol Chemical).

The second class of additive in said system are fatty acid salts (soaps) of magnesium, lithium and/or alkaline earth metals like calcium, strontium and barium, which may be primarily composed of a given soap such as calcium stearate or of mixed salts of two or more metals (at least one of which is from this group) with a given fatty acid or with mixed fatty acids containing between about 12 and about 24 carbon atoms. Examples of suitable fatty acid salts (soaps) useful in the present invention are, for example, Calcium stearate 392A (Synthetic Products); and Magnesium stearate (Synthetic Products).

The third class of additive in the above said stabilizer/lubricant system is stabilizing compounds of Group IVA or VA metals. These stabilizing compounds are primarily those containing tin, lead or antimony and include their soaps, e.g., stearates or octoates and other organic salts, for example, phenolates or maleates. In fact, many different inorganic and/or organic salts of lead, for example, are satisfactory, such as sulfates, silicates, phosphites and phthalates. Basic forms of such lead salts (i.e., those with empirical formulae reflecting the presence of some PbO) are generally preferred. Specific examples suitable for use in the present invention are, for example, tribasic lead sulphate and dibasic lead stearate. The tin and antimony compounds of primary interest in the present invention, on the other hand, are mostly organometallic types such as the well-known dialkyl tin compounds including, for example, dibutyl or dioctyl tin mercaptides or maleates and the like, and various antimony mercaptides or mercapto derivatives such as antimony trilauryl mercaptide, antimony triisooctylthioglycolate or butyl antimony dilauryl mercaptide.

Although not necessary for providing electronconductive, flame retardant thermoplastic molding compositions with adequate physical properties for general use, the potential roles in the present invention of several optional supplemental components need to be explored and discussed more fully in order to assure a full understanding of certain more limited embodiments or refined modifications which might be especially advantageous for particular purposes. As already indicated, the most advantageous class of optional ingredients, and the most important from the point of being advantageous in relatively large amounts, are the polymeric modifiers. These include many different types of essentially thermoplastic resins, but are generally limited to those with reasonable good compatability and at least gross miscibility with rigid vinyl chloride resins.

The most important of these optional polymeric modifiers are those capable of improving impact strength of the thermoplastic resin based molding compositions. For demanding structural applications, the inclusion of such impact modifiers in amounts of from about 5% to about 20% by weight of the total cementitious matrix is highly recommended. In fact, even higher amounts of certain well balanced impact modifiers can be used, for example, up to about 50% by weight or more of said matrix provided they do not significantly diminish other desirable properties of the finished product such as their processability and high temperature strength. The preferred impact modifiers herein are the hybrid elastomeric/plastomeric copolymer products formed by graft-type polymerization of one or more suitable monomers from families such as the vinyl aromatics, acrylate monomers and acrylonitriles with a preformed rubbery backbone or elastomeric trunk polymer, particularly the well-known butadiene-containing rubbers. Other nongrafted polymeric impact modifiers are also known, such as, for example, ethylene-vinyl acetate copolymers and chlorinated polyethylenes, and these sometimes can be used in appropriate amounts herein, either alone or together or in combinations with graft copolymers.

Other polymeric modifiers of interest are generally wholly rigid thermoplastic resins which are completely miscible with a vinyl chloride base resin, hereafter referred to as "processing aids." These may be added to improve melt flow and/or processability of the molding composition and/or to improve high temperature properties, and include post-chlorinated vinyl chloride resins as well as a wide variety of low to high molecular weight miscible copolymers. Examples of such copolymers are, for example, those of methacrylate with ethylacrylate and/or of acrylonitrile with styrene and/or alpha-methyl styrene. When used, these wholly thermosplastic resins can be included at any reasonable level, for example, from about 1% to about 40% by weight of the cementitious matrix, provided the total amount of all polymeric adjuvants is kept below about 50% by weight thereof and the total chlorine content of said cementitious matrix is not reduced below about 24% by weight.

The remaining optional ingredients such as pigments, opacifiers, colorants, liquid lubricants or plasticizers, syngerists or supplemental stabilizers, inert fillers and the like need very little additional comments since they are used in very minor amounts for special effects and in accordance with generally well-established practices in the art. On the other hand, the total amounts of inert solid fillers and/or liquid components do need to be monitored and limited to levels which do not seriously impair either electroconductivity levels or the overall balance of desirable physical properties. Thus, to avoid problems of this nature, the total amount of liquid components should not exceed about 5% by weight of the total thermoplastic cementitious matrix and the combination of inert fillers and liquid components should not total more than about 10% by weight thereof. Liquid components are those components, as described above, which are liquid at ambient temperatures at normal pressures.

The preparation of thermoplastic molding and extrusion compositions of the present invention can generally be accomplished by adaptively coordinated use of known types of mixing equipment to combine the various components thereof into a homogeneously blended mixture consisting of a fused, resin-based cementitious matrix through which the finely divided conductive carbon black particles are well-dispersed with minimal damage thereto. Once achieved, this homogeneously blended dispersion of said carbon black particles through a continuous, fused mass of said cementitious matrix can be readily converted to compact pellets or granules by the usual plastic compounding techniques such as extrusion pelletizing, chopping, dicing, etc.

To prevent extensive pulverizing or breaking up of said carbon black particles during their incorporation and dispersion through said matrix, any dry blending operations for combining them with the matrix component should entail relatively mild or low speed agitation systems. It is preferable, but not critical, to have their ultimate thorough incorporation and dispersion through the matrix effected by a melt shearing and masticating step during which the resinous components reach a fused state and which is normally near the end of the overall mixing sequence. The characteristic slow speed kneading action of such a step enables said carbon black particles to be dispersed thoroughly into a softened, viscous, plasticated matrix without extensive damage of their structural integrity. A variety of plasticating and melt shearing equipment is available for such use, including essentially batch type mixing equipment such as Banbury and roll mills as well as essentially continuous mixers such as kneaders and mixing extruders represented by both twin screw devices and certain two stage, single screw devices.

Certain of the minor auxiliary components of the present compositions can be introduced at almost any step of the overall mixing sequence. For example, any substantially inert filler materials can easily be added either at the matrix premixing state or along with said carbon black particles during or before the melt plastification stage. By the same token, certain other minor additives might logically be introduced along with such fillers, such as wetting agents, dispersion aids and/or other processing aids. Even fine colorants or pigments like $TiO_2$, especially in a predispersed master batch of same in a suitable carrier (e.g., a compatible resin), can sometimes be successfully incorporated at the late stages of the mixing sequence.

However, in the interest of overall production efficiency and economy, it is generally desirable to premix at least most of the matrix components, including, especially, such major ingredients as the rigid vinyl chloride base resin and the essential plasticizers and lubricants to form a homogeneous powder blend of substantially the full cementitious matrix before subjecting same to the melt shearing and plasticating step. It is also understood that adding the carbon black during this premixing is both possible and, in many cases, desirable. Normally, liquid components and at least a major portion of the more significant polymeric modifiers are also generally included in such powder blend premixes.

Also understood is that the use of a starve-fed hopper in a continuous mixer system is both possible and, in some applications, desirable.

A wide variety of blending devices known in the art are satisfactory for preparing powder blends from a combination of ingredients such as those comprising a typical cementitious matrix of the present molding compositions, for example, a combination of ingredients having differing melting or softening points, but most of which are solids at ordinary room temperatures. The most efficient of such blenders are the high intensity, rotating blade types, including such commercially available makes as the Henschel Mixer, the Papenmeier Dry Mixer and the Welex Mixers. Due to the high intensity centrifugal action and turbulence created by their rotating blades, these mixers can rapidly create a homogenous powder blend of various particulate ingredients placed therein. A considerable amount of the kinetic energy of such mixers is simultaneously transferred to the ingredient materials as heat through the impacting and shearing performed thereon as well as resultant collisions and inpingements within the particulate materials. Such frictional heating is usually beneficial up to a point, e.g., by softening or melting some of the waxes and other low melting solids and assisting in a distribution throughout and in the assimilation of the other ingredients. However, the temperatures generated therein should not be allowed to rise sufficiently to cause fusion of major resin components such as the rigid vinyl chloride base resin. Although temperatures of 150° C. or more may be safely reached by the end of said powder blending and premixing step, with most combinations of interest herein, there is usually little or no incentive for employing temperatures quite so high. It is preferred that the powder blend premixing be stopped when temperatures are still below 125° C., for example, at levels in the general range of about 80° C. to 120° C.

Such matrix component premixes can also be made by less intensive or lower speed powder blending techniques and equipment provided that minimizing the cycle time is not a paramount concern. Such a method is, for example, the mixing of ingredients using a ribbon blender. Supplemental heat, if needed, can be introduced in such cases from an external source, for example, and/or by preheating of the component ingredients, if desirable, for expediting the attainment of a sufficiently homogeneous powder blend.

In order to provide a more complete understanding of the present invention and certain details involved in practicing the same, the following specific examples are provided for illustrative purposes only and without any implication that the specific details disclosed are intended to represent limiting conditions therefor. In said examples, parts and percentages are by weight unless otherwise indicated.

MATRIX PREMIX BLEND A

A premix powder blend of matrix components employing a rigid PVC suspension type homopolymer with a K-value of about 51 as the base resin was prepared in accordance with the following formulation in which the proportion of each ingredient used is given in parts per 100 parts by weight of said PVC.

TABLE A

| Ingredient | Weight Proportion Used |
| --- | --- |
| Tribasic Lead Sulfate | 5.0 |
| Lead Stearate | 1.0 |
| Calcium Stearate | 1.5 |
| Paraffinic Wax[1] | 1.5 |

TABLE A-continued

| Ingredient | Weight Proportion Used |
| --- | --- |
| Solid Acrylic Resin Processing Aid[2] | 1.5 |
| Grafted MBS Copolymer[3] | 20.8 |
| Rigid Thermoplastic Blending Resin[4] | 7.0 |

[1]Wax 1014 supplied by Boler Petroleum Co.
[2]Supplied by Rohm & Haas under the Trade Name of ACRYLOID K-125.
[3]A methyl methacrylate-styrene graft copolymer of a high diene content rubber supplied by Rohm & Haas under the Trade Name ACRYLOID KM-611.
[4]A linear copolymer of acrylonitrile with a major proportion of vinyl aromatic comonomers (predominantly alpha-methyl styrene) supplied by Borg Warner under the Trade Name BLENDEX 586.

The blending of said components was accomplished in a high intensity Papenmeier Mixer in the following manner. The stabilizer components containing lead were added to the PVC base resin at ambient temperature and mixed for a few minutes until the temperature reached about 60° C. (140° F.). The calcium stearate, the petroleum wax and the processing aid were charged next and additional mixing performed until the temperature reached about 82° C. (180° F.). Finally, after charging the remaining two polymeric modifiers, the high speed mixing process was continued for a few more minutes until the frictional heat generated had raised the temperature of the blended matrix components to about 104° C. (220° F). The contents were then discharged and cooled, yielding a free flowing, homogeneous powder, hereinafter referred to as "Matrix Premix Blend A."

MATRIX PREMIX BLEND B

A matrix premix powder blend of matrix components employing an intermediate molecular weight rigid PVC suspension type homopolymer with a K-value of about 67 as the base resin was prepared in accordance with the following formulation in which the proportion of each ingredient used is given in parts per 100 parts by weight of said PVC.

TABLE B

| Ingredient | Weight Proportion Used |
| --- | --- |
| Tribasic Lead Sulfate | 5.0 |
| Lead Stearate | 1.0 |
| Calcium Stearate | 1.5 |
| Paraffinic Wax[1] | 1.5 |
| Solid Acrylic Resin Processing Aid[2] | 1.5 |
| Grafted MBS Copolymer[3] | 20.8 |
| Rigid Thermoplastic Blending Resin[4] | 7.0 |

[1]Wax 1014 supplied by Boler Petroleum Co.
[2]Supplied by Rohm & Haas under the Trade Name of ACRYLOID K-125.
[3]A methyl methacrylate-styrene graft copolymer of a high diene content rubber supplied by Rohm & Haas under the Trade Name ACRYLOID KM-611.
[4]A linear copolymer of acrylonitrile with a major proportion of vinyl aromatic comonomers (predominantly alpha-methyl styrene) supplied by Borg Warner under the Trade Name BLENDEX 586.

The blending of said components was accomplished in a high intensity Papenmeier Mixer in the following manner. The stabilizer compounds containing lead were added to the PVC base resin at ambient temperature and mixed for a few minutes until the temperatures reached about 60° C (140° F.). The calcium stearate, the petroleum wax and the processing aid were charged next and additional mixing performed until the temperature reached about 82° C. (180° F.). Finally, after charging the remaining two polymeric modifiers, the high speed mixing process was continued for a few more minutes until the frictional heat generated had raised the temperature of the blended matrix components to about 104° C. (220° F.). The contents were then discharged and cooled, yielding a free flowing, homogeneous powder, hereinafter referred to as "Matrix Premix Blend B."

MATRIX PREMIX BLEND C

A matrix premix powder blend of matrix components employing a rigid PVC suspension type homopolymer with a K-value of about 51 as the base resin was prepared in accordance with the following formulation in which the proportion of each ingredient used is given in parts per 100 parts by weight of said PVC.

TABLE C

| Ingredient | Weight Proportion Used |
| --- | --- |
| Calcium Stearate | 1.0 |
| Paraffinic Wax[1] | 1.3 |
| Wax[2] | 0.25 |
| Stabilizer[3] | 2.0 |
| Chlorinated Polyethylene Modifier[4] | 18.0 |

[1]Wax 1014 supplied by Boler Petroleum Co.
[2]Wax AC629A (PE Wax) supplied by Allied Chemical.
[3]A stabilizer compound containing tin in nonelemental form supplied by Cincinnati Milacron under the designation TM 181.
[4]A chlorinated polyethylene modifier supplied by Dow Chemical under the designation CPE-3615.

The blending of said components was accomplished in a high intensity Papenmeier Mixer in the following manner. The tin containing stabilizer compound and the paraffinic wax were added to the PVC base resin at ambient temperature and mixed for a few minutes until the temperature reached about 82° C. (180° F.). The calcium stearate, the PE was and the modifier were charged next in this order and additional mixing performed until the temperature reached about 104° C. (220° F.). The contents were then discharged and cooled, yielding a free flowing, homogeneous powder, hereinafter referred to as "Matrix Premix Blend C."

In the examples below, the mechanical results given were all results using the following ASTM tests methods:

| Izod Impact (notched & unnotched) | D-256 |
| --- | --- |
| Flexural Strength | D-790 |
| Flexural Modulus | D-790 |

Also in the examples below, the volume resistivity was obtained from both injection and compression molded samples using a six-point probe technique. The probes were mounted on vices which insured tha the resin-rich surface of the ⅛" thick samples were penetrated during measurement. Resistivity was then calculated using the equation:

$$\rho_v = \frac{A}{t} R_v \text{, where}$$

A is the cross-sectional area (in cm$^2$) through which the current flows, t the plaque thickness (in cm) and R$_v$ the volume resistance in ohms. Volume resistivity is reported in units of ohm-cm.

Surface resistivity was not calculated since it has little bearing on the shielding effectiveness of these materials. This is contrary to some publications in the literature. Surface resistivity is of more importance in evaluating the SE of conductive coatings.

EXAMPLE I

This example describes the results of incorporating finely divided conductive carbon black particles at various weight percentage loadings in Matrix Premix Blend C.

The conductive carbon black particles used had an apparent bulk density of 150 g/l and a nitrogen surface area from about 900 to 1,000 m²/g supplied by Armak Company, Burt, N.Y., under the Trade Name KETJENBLACK EC.

Thermoplastic molding compositions containing said conductive carbon black particles were prepared by combining same with Matrix Premix Blend C in various proportions as follows:

TABLE I

| Batch No. | Parts by Weight | | Wt. % Carbon Black |
|---|---|---|---|
| | Matrix C | Carbon Black | |
| 1A | 122.55 | 6.45 | 5 |
| 1B | 122.55 | 13.62 | 10 |
| 1C | 122.55 | 21.63 | 15 |
| 1D | 122.55 | 30.64 | 20 |

After combining the respective materials in the amounts indicated, each batch was gently mixed at substantially ambient temperature to distribute the conductive carbon black particles fairly well through the premix powder blend matrix components. The entire dry blended mixture for each batch was then introduced into a segmented twin screw counter-rotating compounding extruder to produce a conductive carbon black filled thermoplastic resin based cementitious matrix. Conditions in the extruder were adjusted to obtain a melt temperature of said cementitious matrix of approximately 284° F. to 320° F. (140° C. to 160° C.). This resulting material was then pelletized, and the pelletized material was injection molded at a stock temperature of 392° F. (200° C.) into ⅛" thick, 6" wide, 8½" long test specimens and tested for electrical and mechanical properties with the following results:

TABLE I A

| Batch No. | Wt. % Carbon Black | Electrical Resistivity (ohm-cm) | Flexural Strength (psi) | Flexural Modulus (psi × 10⁵) | Izod Impact Strength | |
|---|---|---|---|---|---|---|
| | | | | | Notched | Unnotched |
| | | | | | ft. lbs./in. | |
| 1A | 5 | 6500 | 10648 | 3.98 | 1.16 | 38.3 |
| 1B | 10 | 14.2 | 11089 | 4.08 | 0.67 | 36.1 |
| 1C | 15 | 3.4 | 11530 | 4.68 | 0.62 | 8.4 |
| 1D | 20 | 4.0 | 12512 | 4.7 | 0.51 | 11.0 |

EXAMPLE II

This example describes anti-static formulations based on Matrix Premix Blend A with 5% by weight of conductive carbon black particles having a bulk density of about 150 g/l and nitrogen surface area of about 900 to 1,000 m²/g supplied by Armak under the Trade Name KETJENBLACK EC.

The procedure for processing and making test specimens of batch No. 2A was identical to that described in Example I above. Batch No. 2B was processed and ⅛" thick test specimens made by mixing on a two-roll mill for approximately 5 minutes, milled at 350° F. (177° C.) and then compression molded at approximately 325° F. (163° C.). The resulting electrical and mechanical properties are described below, including the fact that the present formulations are even more impressive when processed on commercial equipment versus laboratory equipment.

TABLE II

| Batch No. | Wt. % Carbon Black | Electrical Resistivity (ohm-cm) | Flexural Strength (psi) | Flexural Modulus (psi × 10⁵) | Izod Impact Strength | |
|---|---|---|---|---|---|---|
| | | | | | Notched | Unnotched |
| | | | | | ft. lbs./in. | |
| 2A | 5 | 4300 | 11474 | 3.99 | 1.06 | 37.8 |
| 2B | 5 | 13504 | 13246 | 3.75 | 0.38 | — |

TABLE II A

| | SHIELDING EFFECTIVENESS (SE) (in dB) | | | | | | | |
|---|---|---|---|---|---|---|---|---|
| | Frequency (MHz) | | | | | | | |
| Batch No. | 0.5 | 1.5 | 5 | 15 | 50 | 250 | 500 | 960 |
| 2B | 0 | 0 | 0 | 0 | 0 | 1 | 1 | 2 |

EXAMPLE III

Using essentially the same procedure and conditions of Example I, samples were prepared using 5% by weight of KETJENBLACK EC conductive carbon black in a matrix premix blend employing a rigid PVC suspension type homopolymer with a K-value of about 58 as the base resin with the following formulation in which the proportion of each ingredient used is given in parts per 100 parts by weight of said PVC formulated essentially in the same manner as Matrix Premix Blend A.

TABLE III

| Ingredient | Weight Proportion Used |
|---|---|
| Stabilizer[1] | 2.0 |
| Solid Resin Processing Aid[2] | 3.0 |
| Paraffinic Wax[3] | 1.3 |
| Calcium Stearate | 1.0 |
| PE Wax[4] | 0.25 |
| CPE Modifier[5] | 18.0 |

[1] A stabilizer supplied by Cincinnati Milacron under the designation TM 181.
[2] Supplied by Amoco Chemicals under the Trade Name RESIN 18-210.
[3] Wax 1014 supplied by Boler Petroleum Co.
[4] Wax AC 629A (PE Wax) supplied by Allied Chemical.
[5] A chlorinated polyethylene modifier supplied by Dow Chemical under the designation CPE-3615.

The mechanical and electrical properties of these injection molded samples processed in a manner essentially like the materials in Example I are as follows:

TABLE III A

| Batch No. | Wt. % Carbon Black | Electrical Resistivity (ohm-cm) | Flexural Strength (psi) | Flexural Modulus (psi × 10⁵) | Izod Impact Strength Notched ft. lbs./in. | Izod Impact Strength Unnotched ft. lbs./in. |
| --- | --- | --- | --- | --- | --- | --- |
| 3 | 5 | 6500 | 11641 | 3.86 | 1.33 | 37.0 |

EXAMPLE IV

Again using essentially the same procedure and conditions as in Example I, samples were prepared using the formulation of Example III with the base resin being a rigid PVC suspension type homopolymer with a K-value of about 67 instead of a K-value of 58. The electrical and mechanical results are as follows from test specimens that were formed into sheets in a two-roll mill at approximately 400° F. (204° C.) for approximately 5 minutes and then compression molded at a temperature of approximately 345° F. (174° C.) into ⅛″ thick by 6″ wide by 8½″ long samples essentially like the samples of Example II.

TABLE IV

| Batch No. | Wt. % Carbon Black | Electrical Resistivity (ohm-cm) | Flexural Strength (psi) | Flexural Modulus (psi × 10⁵) | Izod Impact Strength Notched ft. lbs./in. | Izod Impact Strength Unnotched ft. lbs./in. |
| --- | --- | --- | --- | --- | --- | --- |
| 4 | 5 | 6500 | 10453 | 3.75 | 2.7 | 51.7 |

EXAMPLE V

This example describes the results of incorporating finely divided conductive carbon black at various weight percentage loadings in Matrix Premix Blend B.

The conductive carbon black particles used had an apparent bulk density of 150 g/l and a nitrogen surface area from about 900 to 1,000 m²/g supplied by Armak Comapny, Burt, N.Y., under the Trade Name KETJENBLACK EC.

Thermoplastic molding compositions containing said conductive carbon black were prepared by combining same with Matrix Premix Blend B in various proportions as follows:

TABLE V

| | Parts by Weight | | |
| --- | --- | --- | --- |
| Batch No. | Matrix B | Carbon Black | Wt. % Carbon Black |
| 5A | 138.3 | 15.4 | 10 |
| 5B | 138.3 | 24.5 | 15 |
| 5C | 138.3 | 34.65 | 20 |

After combining the respective materials in the amounts indicated, each batch was gently mixed at substantially ambient temperature to distribute the conductive carbon black particles fairly well through the premix powder blend. The entire dry blended mixture for each batch was then introduced into a two-roll mill at a temperature of from about 380°-390° F. (193°-199° C.) to produce a condutive carbon black filled thermoplastic resin based cementitious matrix in the form of a sheet. This sheet material was then compression molded at a temperature of approximately 370° F. (188° C.) into ⅛″ thick 6″ wide, 8½″ long test specimens and tested for electrical and mechanical properties with the following results:

TABLE V A

| Batch No. | Wt. % Carbon Black | Electrical Resistivity (ohm-cm) | Flexural Strength (psi) | Flexural Modulus (psi × 10⁵) | Izod Impact Strength Notched ft. lbs./in. | Izod Impact Strength Unnotched ft. lbs./in. |
| --- | --- | --- | --- | --- | --- | --- |
| 5A | 10 | 18.49 | 12129 | 3.52 | 0.37 | — |
| 5B | 15 | 4.75 | 13127 | 4.77 | 0.27 | — |
| 5C | 20 | 1.80 | 10483 | 4.06 | 0.24 | — |

TABLE V B

| | SHIELDING EFFECTIVENESS (SE) (in dB) | | | | | | | |
| --- | --- | --- | --- | --- | --- | --- | --- | --- |
| | Frequency (MH₂) | | | | | | | |
| Batch No. | 0.5 | 1.5 | 5 | 15 | 50 | 250 | 500 | 960 |
| 5A | 17 | 17 | 17 | 18 | 18 | 19 | 18 | 18 |
| 5B | 33 | 34 | 34 | 35 | 34 | 35 | 35 | 37 |
| 5C | 43 | 43 | 43 | 43 | 44 | 45 | 48 | 54 |

EXAMPLE VI

This example describes the presently preferred thermoplastic composition of the present invention.

A rigid PVC suspension type homopolymer supplied by Diamond Shamrock Corporation under the designation PVC 35 with a K-value of about 58 as the base resin was used in the following formulation in which the proportions of each ingredient used is given in parts per 100 parts by weight of said PVC.

TABLE VI

| Ingredient | Weight Proportion Used |
| --- | --- |
| Calcium Stearate | 1.5 |
| Magnesium Stearate | 0.5 |
| Stabilizer[1] | 2.25 |
| Paraffinic Wax[2] | 1.5 |
| PE Wax[3] | 0.25 |
| Solid Acrylic Resin Processing Aid[4] | 1.5 |
| Processing Aid[5] | 2.0 |
| Chlorinated Polyethylene Modifier[6] | 18.0 |
| Carbon Black[7] | 15.0 = 10.5 wt. % |

[1] A stabilizer compound containing tin in nonelemental form supplied by Cincinnati Milacron under the designation TM 181.
[2] Wax 1014 supplied by Boler Petroleum Co.
[3] Wax AC629A (PE Wax) supplied by Allied Chemical.
[4] An acrylic polymer supplied by Rohm & Haas under the designation Acryloid K-175.
[5] Resin 18-210 supplied by Amoco Chemicals.
[6] A chlorinated polyethylene modifier supplied by Dow Chemical under the designation CPE-3615.
[7] A conductive carbon black supplied by the Armak Company under the designation KETJENBLACK EC.

The blending of said components was accomplished in a high intensity Papenmeier Mixer in the following manner. The PVC resin was first fluidized then the calcium stearate, magnesium stearate and stabilizer were added at ambient temperature and mixed for a few minutes until the temperature reached about 140° F. (60° C.). The rest of the ingredients minus the carbon black were added next and additional mixing performed until the temperature reached about 220° F. (104° C.). At this point, the carbon black was added and mixing continued for a few more minutes. The contents were then discharged and cooled. The test samples were ⅛" thick and were made using a two-roll mill, milled at 320° F. (160° C.) for appoximately 5 minutes and compression molded into test sample plaques at 330° F. (166° F.).

TABLE VI A

| Batch No. | Wt. % Carbon Black | Electrical Resistivity (ohm-cm) | Flexural Strength (psi) | Flexural Modulus (psi × 10⁵) | Izod Impact Strength Notched ft. lbs./in. | Unnotched |
|---|---|---|---|---|---|---|
| 6 | 10.5 | 150 | 12000 | 4.2 | 1.0 | 27.0 |

EXAMPLE VII

This example describes formulations based on Matrix Premix Blend A, with various amounts of conductive carbon black having a bulk density of 259 g/l and a nitrogen surface area of 254 m²/g supplied by Cabot Corporation under the designation Vulcan XC-72. The Matrix Premix Blend A and carbon black were, in each case, mixed on a two-roll mill for approximately 5 minutes, milled at 320° F. (160° C.) and then compression molded into test sample plaques at 330° F. (166° C.).

TABLE VII

| Batch No. | Wt % Carbon Black | Electrical Resistivity (ohm-cm) | Test Sample Thickness (in.)* |
|---|---|---|---|
| 7A | 30 | 3.91 | 0.125 |
| 7B | 40 | 2.34 | 0.075 |

*The 0.075" thick sample was 6" × 6" whereas the 0.125" thick samples were molded to 6" × 8½". This is due only to the particular picture frame molds available at the time of testing.

One of the 30 weight percent carbon black test samples was measured for shielding effectiveness (SE) and showed a flat response of 20–23 dB for the frequencies 0.5 to 960 MH$_z$.

In the above examples, it will be obvious that various alternative materials can be substituted and minor amounts of supplemental, relatively inert components can be added in accordance with the general teachings of the present invention provided herein while still attaining the principal advantages and basic objectives thereof. Accordingly, the scope of patent protection sought hereby is not restricted by the specific illustrative examples, but rather is to be determined by the claims which follow.

What is claimed is:

1. A flame retardant, thermoplastic composition of high electroconductivity for manufacture of static electricity dissipating devices comprising between about 2% and about 45% by weight of finely divided conductive carbon black substantially uniformly dispersed within a cementitious matrix having a chlorine content of at least about 24% by weight and composed predominantly of substantially thermoplastic resins not substantially less than half of which by weight are vinyl chloride polymers which have a vinyl chloride content of at least about 80% by weight and K-values between about 45 and about 70, said cementitious matrix also containing a stabilizer/lubricant system comprising at least three different classes of additive, said classes of additive consist of (1) waxy lubricants which are solid at temperatures up to at least 50° C. under normal pressure, (2) fatty acid salts of magnesium, lithium or alkaline earth metals , and (3) stabilizing compounds containing metal ions selected from the group consisting of lead, tin and antimony, each said classes of additive being present in the composition in an amount of at least 1% by weight of the cementitious matrix and in total not exceed 15% by weight of the total cementitious matrix.

2. A composition as claimed in claim 1 wherein said cementitious matrix includes up to about 50% by weight of polymeric adjuvants melt blended with said vinyl chloride polymers, said polymeric adjuvants are selected from the group consisting of impact strength additives and high temperature processing aids.

3. A composition as claimed in claim 2 wherein said polymeric adjuvants include at least one partly elastomeric polymer in amounts of at least about 1% by weight of said cementitious matrix.

4. A composition as claimed in claim 3 wherein said partly elastomeric polymer is either a graft copolymer formed by graft polymerizing one or more of vinyl aromatics, acrylate monomers and acrylonitriles on a preformed rubbery backbone polymer or on a chlorinated linear polyethylene containing between about 25% and about 50% by weight combined chlorine.

5. A composition as claimed in claim 2 wherein said polymeric adjuvants include at least one nongrafted polymeric impact modifier in amounts of at least about 1% by weight of said cementitious matrix.

6. A composition as claimed in claim 1 wherein said cementitious matrix includes various minor additives including pigments, inert fillers, liquid plasticizers, liquid lubricants, synergists and mixtures thereof in an amount of about 10% by weight or less.

7. A flame retardant, thermoplastic composition of high electroconductivity for manufacture of static electricity dissipating devices by extrusion comprising about 10% by weight of the final composition, of finely divided conductive carbon black particles, substantially uniformly dispersed within a cementitious matrix having a chlorine content of at least about 24% by weight and composed predominantly of about 70% by weight of a vinyl chloride rigid homopolymer thermoplastic resin having a K-value of about 50 to 60, said cementitious matrix also containing about 10% to 20% by weight of a chlorinated polyethylene modifier having a chlorine content of about 30% to 40% by weight and a well balanced lubricant/stabilizer system comprising a balanced stabilizer system of about 1% to 3% by weight of tin mercaptide stabilizer, about 2% to 4% by weight of a balanced lubricant system consisting of a paraffinic wax, calcium stearate and magnesium stearate, and a polyethylene wax as well as about 1% to 5% by weight of a processing aid.

8. A composition as claimed in claims 7 or 1 wherein said finely divided conductive carbon black has a bulk density of from about 125 g/l to about 300 g/l and a nitrogen surface area from about 200 to 1,500 m²/g.

9. A flame retardant thermoplastic composition as claimed in claims 7 or 1 wherein said vinyl chloride polymers have number average molecular weights of from about 25,000 to about 110,000.

10. A flame retardant, thermoplastic composition as claimed in claims 7 or 1 wherein said vinyl chloride polymers have number average molecular weights of from about 40,000 to about 85,000.

11. A flame retardant, thermoplastic extrusion composition as claimed in claim 1 wherein said vinyl chloride has K-values between 50 and 60.

12. A process for producing a composition as claimed in claims 7 or 1 wherein said conductive carbon black is added to the other ingredients by utilizing a starve-fed hopper system to an extruder, continuous mixer or kneader.

13. A process for producing a composition as claimed in claims 7 or 1 wherein said conductive carbon black is added to the other ingredients before introduction to a hopper of an extruder, continuous mixer or kneader.

14. A process for producing a composition as claimed in claims 7 or 1 wherein said conductive carbon black is added to said cementitious matrix by introduction into one of the final zones of an extruder, continuous mixer or kneader.

15. A process for producing a composition as claimed in claims 7 or 1 wherein said conductive carbon black and the other ingredients are simultaneously introduced to the hopper of a batch mixer.

16. A process for producing an extruded article from the composition as claimed in claims 7 or 1 wherein said article is produced by profile extrusion or sheet extrusion which may be followed by vacuum molding or other reshaping operation.

17. An extruded article produced using the compositions as claimed in claims 7 or 1.

* * * * *